US008458003B2

(12) United States Patent
Conigliaro et al.

(10) Patent No.: US 8,458,003 B2
(45) Date of Patent: Jun. 4, 2013

(54) SYSTEMS AND METHODS FOR EFFICIENT DELIVERY OF FINANCIAL ADVISORY SERVICES

(76) Inventors: Christopher Conigliaro, Bedford, NY (US); Charles Hamowy, New York, NY (US)

( * ) Notice: Subject to any disclaimer, the term of this patent is extended or adjusted under 35 U.S.C. 154(b) by 0 days.

(21) Appl. No.: 13/507,205

(22) Filed: Jun. 12, 2012

(65) Prior Publication Data

US 2012/0290352 A1  Nov. 15, 2012

Related U.S. Application Data

(63) Continuation-in-part of application No. 13/038,579, filed on Mar. 2, 2011, now abandoned, which is a continuation of application No. 11/064,189, filed on Feb. 23, 2005, now abandoned.

(60) Provisional application No. 61/629,155, filed on Nov. 14, 2011.

(51) Int. Cl.
*G06Q 10/00* (2012.01)
(52) U.S. Cl.
USPC .................................... 705/7.13; 705/36 R
(58) Field of Classification Search
CPC ................................................... G06Q 10/109
USPC ........................................ 705/35, 713, 36 R
See application file for complete search history.

(56) References Cited

U.S. PATENT DOCUMENTS

| 5,819,263 A * | 10/1998 | Bromley et al. ............... 1/1 |
| 6,021,397 A | 2/2000 | Jones et al. |
| 6,064,984 A | 5/2000 | Ferguson et al. |
| 6,272,528 B1 | 8/2001 | Cullen et al. |
| 2002/0091607 A1 | 7/2002 | Sloan et al. |
| 2002/0095363 A1 | 7/2002 | Sloan et al. |
| 2002/0111890 A1 | 8/2002 | Sloan et al. |
| 2003/0088489 A1 | 5/2003 | Peters et al. |
| 2003/0144936 A1 | 7/2003 | Sloan et al. |
| 2003/0144944 A1 | 7/2003 | Kalt et al. |
| 2003/0208427 A1 | 11/2003 | Peters et al. |
| 2003/0212628 A1 | 11/2003 | Kuttan et al. |
| 2003/0225662 A1 | 12/2003 | Horan et al. |

(Continued)

FOREIGN PATENT DOCUMENTS

| WO | WO2005091181 | * | 9/2005 |
| WO | WO2010047691 A1 | * | 4/2010 |

OTHER PUBLICATIONS

Rogelio Oliva et al., Merrill Lynch: Supernova, Harvard Business School, Oct. 9, 2003.

*Primary Examiner* — Eric T Wong
(74) *Attorney, Agent, or Firm* — Ronald Abramson; Hughes Hubbard & Reed LLP

(57) ABSTRACT

System comprising a set of interconnected processors for managing the delivery of financial advisory services. In one embodiment, the system manages activities and workflows for a plurality of clients over a financial planning period. The financial planning period may comprise a calendar year, which may be divided into distinct seasonal portions, each with a predetermined, specific focus on a financial topic or grouping of topics. Workflow of the firm may be controlled by utilizing a plurality of processors to automate workflow handling. A first processor is used for individual client scheduling, a second processor aggregates the appointments, calculates utilization metrics based thereon, and a third processor generates reports, providing feedback to modulate input into the first processor.

10 Claims, 8 Drawing Sheets

U.S. PATENT DOCUMENTS

2004/0054610 A1 3/2004 Amstutz et al.
2007/0041574 A1* 2/2007 Baldovinos .................. 379/386
2008/0034281 A1* 2/2008 Handsaker et al. ........... 715/219
2009/0292578 A1* 11/2009 Danis et al. ...................... 705/9

* cited by examiner

| PHASE 2 OR "TRACK" LIST | TO BE USED WHEN ADVISOR AND CLIENT AGREE ON ONGOING SERVICE PROGRAM AND FEES. ADVISOR "PROMOTES" CLIENT TO PHASE 2 OR "TRACK" AND CLIENT SERVICE COORDINATOR TAKES OVER. | |
|---|---|---|
| LAST NAME(S) | FIRST NAMES(S) | STATE |
| SMITH | JANE | NY |
| WILLIAMS | BILL | NJ |
| BLACK | BARRY | NY |
| POUND | PINKAS | NY |
| BLACK | CILLA | NY |
| STONE | FRED | NY |
| BLYTHE | BILLY | NY |
| RHODES | CARTER | NY |
| JAMESON | OLLY | NJ |
| COLON | CURTIS | NJ |
| DAVID | MARK | NY |
| STEVENS | SANDRA | NY |
| PELLTS | STEVEN | NY |
| ANDREWS | ABBY | NJ |
| PITSTOP | PENELOPE | NY |
| JINKINS | SUSAN | NY |
| BARSELLA | FLAVIO | NY |
| BARTOLINO | MEYA | NY |
| HALL | FREYA | NY |
| SIMONS | KITTY | NY |
| MALANY | MULTA | NJ |
| FRESHWATER | PERRY | NJ |
| SAMSON | DELILAH | NY |
| FORTUNE | KID | NY |
| ROTTEN | JERRY | NY |
| TOMS | JULIE | NJ |
| STELLON | VIV | NY |
| TYLER | MORA | NY |
| JONES | NORA | NY |
| SPECKLE | BETTY | NY |
| JONES | SUSAN | NY |
| JEFFRY | BILLY | NY |
| HANNS | SCARLET | NJ |

FIG. 4

| | | | | 2012 SEASONAL CLIENT SERVICING DATES SCHEDULED | | | |
|---|---|---|---|---|---|---|---|
| ⌐409 | ⌐405 | ⌐410 | ⌐406 | ⌐411 | ⌐407 | 412 | ⌐408 |
| 27% | | 25% | | 2% | | 2% | |
| GOAL TRACKING | | ASSET ALLOCATION | | MID YEAR REVIEW | | TAX PLANNING | |
| 16-JAN-12 | 9AM | 10-MAY-12 | 2:30PM | | | | |
| 17-JAN-12 | 12PM CC | 8-MAY-12 | 1PM | 5-AUG-12 | 8:30AM WEB | 6-NOV-12 | 9AM |
| 18-JAN-12 | 5PM | 8-MAY-12 | 9AM | | | | |
| 16-JAN-12 | 2PM | 10-MAY-12 | 6PM | | | | |
| 16-JAN-12 | 4PM | 9-MAY-12 | 4PM | | | | |
| 25-JAN-12 | 5PM | 28-MAY-12 | 5:30PM | | | | |
| 30-JAN-12 | 2PM | 30-MAY-12 | 4PM CC | | | | |
| 25-JAN-12 | 1PM | 11-MAY-12 | 3PM WEB | | | | |
| 26-JAN-12 | 2PM | 10-MAY-12 | 11AM | | | | |
| 3-FEB-12 | 9AM | 16-MAY-12 | 9AM | | | | |
| 3-FEB-12 | 10:30AM | 17-MAY-12 | 10AM | | | | |
| 7-FEB-12 | 10AM | 17-MAY-12 | 4PM | | | | |
| 6-FEB-12 | 8:30AM | 29-MAY-12 | 1PM | | | | |
| 14-FEB-12 | 9AM | 28-MAY-12 | 11:30AM | | | | |
| 16-JAN-12 | 10AM | 29-MAY-12 | 4PM | | | | |
| 16-JAN-12 | 9AM | | | | | | |

FIG. 4 (Cont.)

| Week Start | Total Set | Seasonal Capacity Presumed at 12 Per Week | Available to Book | % Complete |
|---|---|---|---|---|
| 1/2/2012 | | 510 | | Seasonal Planning Clients 60 |
| 1/9/2012 | | | | |
| 1/16/2012 | 7 | 12 | 5 | |
| 1/23/2012 | 3 | 12 | 9 | |
| 1/30/2012 | 3 | 12 | 9 | |
| 2/6/2012 | 2 | 12 | 10 | |
| 2/13/2012 | 1 | 12 | 11 | |
| 2/20/2012 | 0 | 0 | 0 | |
| 2/27/2012 | 0 | 0 | 0 | 27% |
| 3/5/2012 | 0 | 0 | 0 | |
| 3/12/2012 | 0 | 0 | 0 | |
| 3/19/2012 | | 511 | | |
| 3/26/2012 | | | | |
| 4/2/2012 | | | | |
| 4/9/2012 | | | | |
| 4/16/2012 | | | | |
| 4/23/2012 | | | | |
| 4/30/2012 | 0 | 12 | 12 | |
| 5/7/2012 | 7 | 12 | 5 | |
| 5/14/2012 | 3 | 12 | 9 | |
| 5/21/2012 | 0 | 12 | 12 | |
| 5/28/2012 | 5 | 12 | 7 | 25% |

FIG. 5

| | | | | |
|---|---|---|---|---|
| 6/4/2012 | //// 512 //// | | | |
| 6/11/2012 | | | | |
| 6/18/2012 | | | | |
| 6/25/2012 | | | | |
| 7/2/2012 | | | | |
| 7/9/2012 | | | | |
| 7/16/2012 | | | | |
| 7/23/2012 | | | | |
| 7/30/2012 | 1 | 12 | 11 | ⎫ 507 |
| 8/6/2012 | 0 | 12 | 12 | |
| 8/13/2012 | 0 | 12 | 12 | |
| 8/20/2012 | 0 | 12 | 12 | 518 |
| 8/27/2012 | 0 | 12 | 12 | ⎭ 2% |
| 9/3/2012 | //// 513 //// | | | |
| 9/10/2012 | | | | |
| 9/17/2012 | | | | |
| 9/24/2012 | | | | |
| 10/1/2012 | | | | |
| 10/8/2012 | | | | |
| 10/15/2012 | | | | |
| 10/22/2012 | | | | |
| 10/29/2012 | 0 | 12 | 12 | ⎫ 508 |
| 11/5/2012 | 1 | 12 | 11 | |
| 11/12/2012 | 0 | 12 | 12 | |
| 11/19/2012 | 0 | 12 | 12 | |
| 11/26/2012 | 0 | 12 | 12 | ⎭ |
| 12/3/2012 | //// 514 //// | | | |
| 12/10/2012 | | | | 519 |
| 12/17/2012 | | | | |
| 12/24/2012 | | | | |
| | | | | 2% |

| Sample and Associates | | | | Monthly Flash Report | |
|---|---|---|---|---|---|
| Target Average Revenue Per Client (Business Plan) | | | | | $2,000 |
| Current Revenue Per Client as of: | | | | January 2012 | $1,358 |
| Target # Planning Clients (Business Plan) | | | | | 130 |
| Current # Planning Clients (APS) | | | | January 2012 | 108 |
| Target % Clients Generating TOS GDC (Business Plan) | | | | | 70% |
| Current % Clients Generating TOS GDC (APS) | | | | January 2012 | 59% |
| <u>Actual Clients Per Most Recent Report (APS)</u> | | | | January 2012 | 209 |
| Assumed "Working" Clients | | 199 | | | |
| Phase 2 (Track) Clients | | 162 | | | |
| Phase 1 in Process | | 10 | | | |
| Total | | 172 | | | |
| Diff (Need Research) | | 5 | | | |
| | | 177 | | | |
| Workflow Efficiency | | | | | |
| | Work Per | *Qty in Cat | Total Alloc | | |
| Seasonal | 12 | 60 | 720 | | |
| Standard Planning | 6 | 48 | 288 | | |
| Review Only | 3 | 54 | 162 | | |
| | | 162 | 1,170 | | |
| | Total Avail Hrs | | 4,000 | | |
| | Avail for Mktg, Training, Vacations, Phase 1 etc | | 71% ─ 601 | | |
| | Anything Over <u>33%</u> is a Concern! (Fill in Your Number) | | | | |
| 2012 Seasonal Planning Appointment Status *(Pre-populates from Service Appointment Summary) | | | | | |
| GT 27% ─ 602 | AA 25% ─ 603 | | MYR 2% ─ 604 | | TP 2% ─ 605 |
| 2012 Standard Planning Appointment Status *(Pre-populates from Service Appointment Summary) | | | | | |
| | Jan-June 19% ─ 606 | | July-Dec 19% ─ 607 | | |
| 2012 Investment Only Appointment Status *(Pre-populates from Service Appointment Summary) | | | | | |
| | Jan-June 17% ─ 608 | | July-Dec 19% ─ 609 | | |

FIG. 6

SYSTEMS AND METHODS FOR EFFICIENT DELIVERY OF FINANCIAL ADVISORY SERVICES

CROSS-REFERENCE TO RELATED APPLICATIONS

Prior Applications

This application is a continuation-in-part of U.S. patent application Ser. No. 13/038,579, filed Mar. 2, 2011 now abandoned (published as U.S. Pat. Pub. No. 2011/0153482 on Jun. 23, 2011), which was a continuation of U.S. patent application Ser. No. 11/064,189, filed Feb. 23, 2005 now abandoned, and claims the benefit under 35 U.S.C. §120 of the respective filing dates of said applications; this application also claims the benefit under 35 U.S.C. §119(e) of the filing date of U.S. provisional patent application Ser. No. 61/629,155, filed Nov. 14, 2011. The entire disclosure of each of the above-mentioned applications is incorporated herein by reference.

COMPUTER PROGRAM LISTING APPENDIX

A computer program listing appendix recorded on a CDROM disc has been filed as an Appendix to this disclosure, containing the following files:

| File Name | File Date | File Size |
|---|---|---|
| sheet1.xml | Nov. 11, 2011 | 4,620 |
| sheet10.xml | Nov. 11, 2011 | 6,115 |
| sheet11.xml | Nov. 11, 2011 | 439 |
| sheet2.xml | Nov. 11, 2011 | 11,622 |
| sheet3.xml | Nov. 11, 2011 | 8,912,073 |
| sheet4.xml | Nov. 11, 2011 | 4,250,244 |
| sheet5.xml | Nov. 11, 2011 | 8,693 |
| sheet6.xml | Nov. 11, 2011 | 5,597 |
| sheet7.xml | Nov. 11, 2011 | 484 |
| sheet8.xml | Nov. 11, 2011 | 8,559 |
| sheet9.xml | Nov. 11, 2011 | 506 |
| sheet1.xml.rels | Nov. 11, 2011 | 322 |
| sheet10.xml.rels | Nov. 11, 2011 | 322 |
| sheet2.xml.rels | Nov. 11, 2011 | 322 |
| sheet3.xml.rels | Nov. 11, 2011 | 322 |
| sheet4.xml.rels | Nov. 11, 2011 | 322 |
| sheet5.xml.rels | Nov. 11, 2011 | 322 |
| sheet8.xml.rels | Nov. 11, 2011 | 322 |
| sheet9.xml.rels | Nov. 11, 2011 | 299 |

The entire content of each of the files listed above is incorporated by reference in this disclosure.

FIELD OF THE DISCLOSURE

This disclosure is in the field of financial advisory services and concerns systems and methods for using a set of interconnected processors to manage the delivery of such services.

BACKGROUND OF THE RELATED ART

Conventional financial advisor-client relationships vary considerably depending on such factors as the particular style of the financial advisor, the advisor's affiliated brokerage or financial services firm, if any, and/or the desires and needs of each client. Generally, financial advisors tailor their advice and efforts towards rendering services that are most beneficial to individual client needs.

Because each client's particular life circumstances, assets, income, etc., are different, a financial advisor's manner of handling client investment portfolios varies from client to client. Meetings may raise unexpected topics, and the resulting work may be scheduled at unpredictable times, leading to inefficient use of the advisory firm's resources.

SUMMARY OF THE DISCLOSURE

This summary and the accompanying abstract are provided for summary purposes only. The brevity of description in these sections should not be taken to imply any limitations on the scope of the disclosure or the claims. The reader should turn to the drawings and detailed description below for a more complete understanding of the disclosure, and to the claims, for understanding the scope of the invention.

We disclose a system comprising a set of interconnected processors for managing the delivery of financial advisory services for a plurality of financial advisory cluients. In one embodiment, the system manages activities and workflows during a financial planning period. The financial planning period is divided into a plurality of specified time periods, each associated with a substantially distinct topic.

In one embodiment, a financial planning year may be a calendar year, and it may be divided into distinct seasonal portions, each with a predetermined, specific focus on a financial topic or grouping of topics. In such embodiment, the respective seasonal topics may comprise goal tracking, asset allocation, mid-year reviews and tax planning.

In a further embodiment, the system comprises three interconnected processors. A first processor is used for individual client scheduling, a second processor aggregates the appointments, calculates utilization metrics based thereon, and a third processor generates reports, providing feedback to modulate input into the first processor.

BRIEF DESCRIPTION OF THE DRAWINGS

The foregoing and other aspects and advantages of the disclosure will be better understood from the following detailed description, with reference to the drawings, in which:

FIG. 4 is the user interface for an exemplary first processor for scheduling client meetings.

FIG. 5 is the user interface for an exemplary second processor for aggregating the data provided by the processor corresponding to FIG. 4 and generating status and productivity reports based thereon.

FIG. 6 is the user interface for an exemplary third processor for generating a report based on data provided by the processor corresponding to FIG. 4.

DETAILED DESCRIPTION

Figure 1:
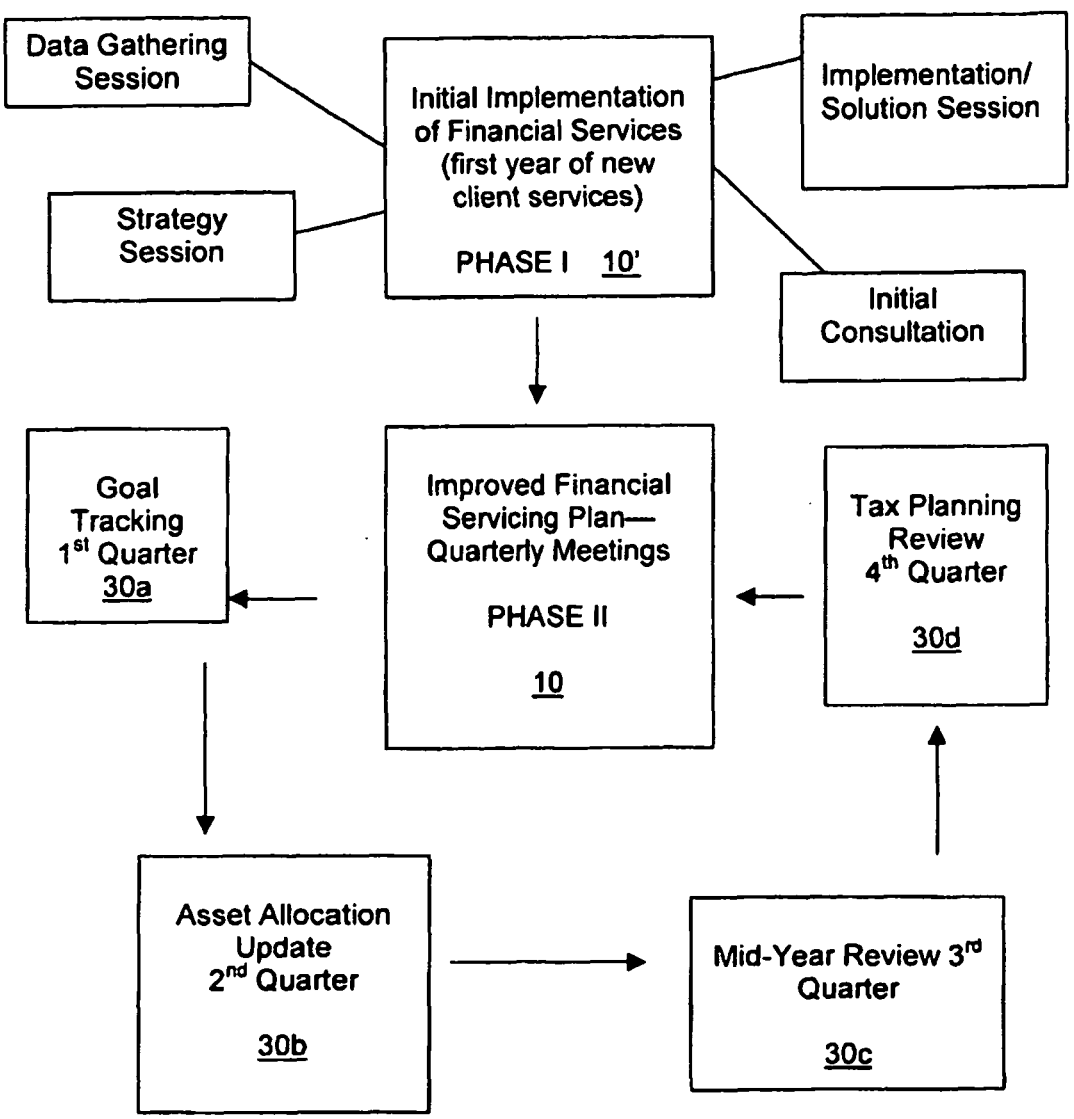
FIG. 1 is a flow diagram of a method of providing structured financial planning services, including an initial implementation period prior to integration of a client into the seasonal method of the disclosure.

The following detailed description is provided to illustrate the principles of the disclosure by a detailed description of certain illustrative embodiments. The features and attributes selected for purposes of these illustrations should not be understood as limiting the appended claims.

The term financial advisor as used herein includes financial planners (including certified Financial Planners™), registered investment advisers under the Investment Advisers Act of 1940, brokers, representatives, consultants, agents, and in general any person whose responsibilities include providing financial planning, advice, management and similar assistance or services to a plurality of clients. ("Certified Financial Planner" is a registered trademark of Certified Financial Planner Board of Standards, Inc.)

Services in many professions (e.g., medical, legal, etc.) address client needs as they arise and are not markedly seasonal. By contrast, needs for financial planning, particularly personal and family financial planning, tend to track predictable events during the calendar year. This is so because of tax filings and payments, retirement contributions, tuition payments, employment reviews, bonuses, vacations, and other events, many of which regularly occur on a periodic basis over the course of the year.

We have found that it is advantageous to coordinate the activities of financial planners and the firms in which they operate with a seasonal calendar of such events, and to group the topics of seasonal advice in accordance with what is most relevant to the season. The decisions of which activities occur in certain seasons also relate to a consistency in how the mind naturally processes certain data (neuro-lingustic programming). We try to match behavioral science understandings to financial decision making and actions. A schedule resulting from such correlation may be advantageously used to control both client scheduling and the firm's own workflow, to increase client satisfaction and the firm's productivity.

The approach described herein seeks to focus each set of seasonal client meetings on a selected set of general categories of topics in a manner that is substantially identical for a plurality of clients. The categories and topics are approached in a manner that may be tailored to suit particular client needs, and the focus/content of client-advisor meetings will vary depending on circumstances particular to each client, such as income, age, existing assets, number of dependents, etc., as well as contemporaneous life events.

The seasonally organized planning service described herein is intended as a fee service, wherein clients are charged depending upon the level of and complexity of the services desired. Generally, an ongoing fee structure for premium service level clients ranges from $1,000 to $5,000 per year. The fees may be renewed or billed annually, such that the minimum plan count for the following year may be determined in advance.

Depending on the nature of the firm's business and clientele, the seasonal methodology described herein may be utilized for a portion of the firm's clients, leaving other portions to be handled in a conventional manner ("standard" clients), or to be handled specially ("special" clients), e.g., if the relationship with those clients is limited in some respect, e.g., to investment management. It will be assumed throughout this disclosure that the firm may have practices related to such other categories of clients in addition to the ones being serviced on a seasonal basis as more particularly described herein. Indeed, the workflow for such conventional or special-purpose clients may be integrated with the workflow management described herein, for an overall workflow management system from the firm.

As indicated, this disclosure concerns dividing the financial planning year into distinct portions and planning specific meetings and activities keyed to each such portion. More particularly, an organization based on seasons or calendar quarters is suggested. However, it is consistent with the disclosure to structure services on a fiscal period other than a calendar year or to divide the services into greater or fewer number of stages per period, depending upon a firm's and a client's desires.

The words "season" and "quarter" are used interchangeably herein, and are meant to be understood in an approximate sense, and subject to variation in duration and frequency over a year. The terms "season," "seasonal," "quarter," or "quarterly" are intended to serve as a guide for a preferred division of a year, rather than a narrowly defined three-month, or meteriologically seasonal, period of time. It should also be understood that while four seasonal or quarterly portions are preferred, more or less distinct periods may be provided, so long as each portion is established to focus substantially exclusively on predetermined topics or groups thereof for enhanced organization and streamlining of a financial office's workflow.

Seasonal Client Servicing Approach

In one embodiment, as will be discussed in detail below, an individual's or family's annually recurring financial events and issues may be divided into four seasonal increments (referred to below in an approximate sense as "quarters"). After an initial introductory phase (sometimes referred to herein as "Phase 1"), client meetings and services will be scheduled in accordance with this seasonal breakdown (sometimes referred to herein as "Phase 2").

FIG. 1 is an overview of such an embodiment, depicting a general method 10 for providing structured financial planning services.

Figure 2:
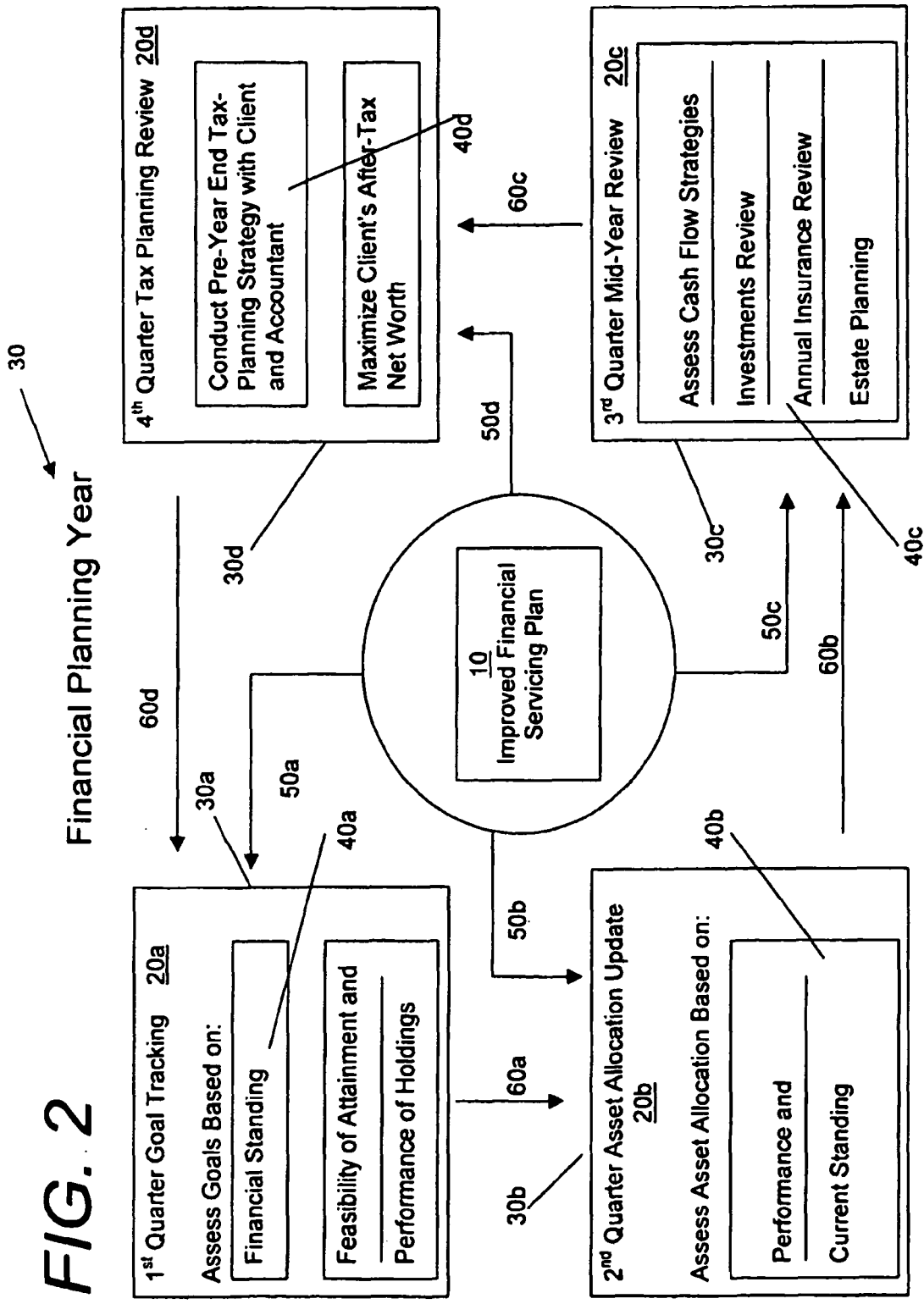
FIG. 2 is a detailed view of a method of providing seasonally structured financial services in accordance with the present disclosure, as set forth in Phase 2 in FIG. 1.

An introductory or initial implementation period (Phase 1) 10' may be provided prior to putting a client on a seasonal advisory program. During the initial implementation period, a preliminary advisor-client relationship may be established, prior to client integration into a seasonal program (Phase 2). The initial implementation period 10' may include an initial consultation, data gathering discussion, strategy discussion, implementation discussion, etc., all or some of which may be conducted through in-person meetings, as shown in FIG. 1. The initial implementation period 10' may extend approximately one year, such that a client will not be transitioned into the subdivided planning year of the seasonal method 20 until the expiration of the year, or alternately, a lesser period of several months, for example, when a particular client is integrated into seasonal service schedule. Adoption and implementation of the financial planning method 10, beyond the initial implementation period 10' illustrated as Phase 1 in FIG. 1 may vary, as not all clients will be integrated into the seasonal financial servicing plan precisely at the same time, e.g., during the first quarter 30a. Integration of a client within a seasonal program could occur during any of the predetermined portions of the financial planning year, as illustrated by arrows 50a, 50b, 50c and 50d. For instance, if a client is integrated into the seasonal system at arrow 50b, as shown in FIG. 2, then two or three meetings may occur during the particular financial planning year 30. Such initial services 10' may be provided by the advisor without charge, with the intent that a fee service relationship will ultimately develop. In this manner, advisor-client meetings or consultations could occur successively as illustrated, for example, by arrows 60a, 60b, 60c and 60d, at substantially regular intervals over a financial planning year and repeated over successive years throughout the life of the advisor-client relationship.

As shown in FIG. 2, under a seasonal approach, during each portion of the financial planning year 30 (which may each take place during a specified portion of the calendar year), a predetermined topic 40 (or group of topics) is selected, which is the focus of the advisor-client relationship during that portion. This applies to all clients of an advisor or group of advisors and preferably, all or of the clients of the firm (or for however many of those clients for whom recurring seasonally based financial planning services is selected), such that the financial planning year 30 of all clients on this program, beyond the initial implementation of services phase (Phase 1) 10', is synchronized.

Where such a series of seasonal meetings is adopted, the financial planning year 30 will be divided into quarters, e.g., 30a, 30b, 30c and 30d as shown in FIGS. 1 and 2, such that a first, second, third and fourth individual meeting 20a, 20b, 20c and 20d, between the financial advisor and each of a plurality of clients, focus on first, second, third and fourth predetermined, specific topics, 40a, 40b, 40c and 40d, respectively, during substantially the corresponding first, second, third and fourth quarters 30a, 30b, 30c and 30d of the financial planning year.

During the financial planning year 30, the advisor-client relationship focuses on broad financial topics 40, including client goals, asset allocation, investments, estate planning, insurance, tax considerations, etc. Preferably, this may be reduced to the four general seasonal topics of Goal Tracking, Asset Allocation, Mid-Year Reviews and Tax Planning, discussed at four regularly scheduled meetings over the course of a calendar year.

Dividing a financial planning year 30 divided into quarters 30a, 30b, 30c, 30d, which incorporate the foregoing topics, and optionally others, in an organized manner, i.e., at substantially regular intervals during exclusive portions of the financial planning year 30, achieves improved advisor-client relations and organization, thus streamlining office workflow and personnel efforts.

During each of the distinct portions of the financial planning year 30, there will be a meeting 20 between the financial advisor and each of a plurality of clients, focusing substantially exclusively on the selected, predetermined topic or groups of related topics 40 designated for that predetermined portion of the financial planning year 30. Thus, substantially all of an advisor's clients, beyond those in Phase 1 (10'), and with the exception of any "standard" or "special" clients, will be integrated into the seasonal system such that the financial planning year 30 of each of a plurality of clients is substantially synchronized. Thus, in preparing for a set of client meetings, the advisor may focus on preparing to present and answer questions primarily in relation to the same limited set of topics, for those meetings. It is preferred that a first, second, third and fourth individual meeting, 20a, 20b, 20c and 20d, between the advisor and each of the advisor's clients is held during respective first, second, third and fourth portions of said financial planning year 30a, 30b, 30c and 30d, as shown in FIG. 2.

We address now the detailed arrangements in a preferred embodiment, in which advisor-client meetings 20 will be scheduled during a calendar financial planning year on a seasonal basis.

First Quarter—Goal Tracking

A first quarter meeting may be scheduled for a time early in the year, after the client's prior tax year has been closed out. A useful grouping of topics for this meeting may be referred to as "Goal Tracking." An advisor-client meeting that focuses on the topic of goal assessment during the first quarter of the financial planning year is particularly desirable, in that client goals and assets tend to fluctuate yearly depending on such factors as increased or decreased salary, future expenses, together with investment outcomes of the previous financial planning year. Thus, a first quarter meeting 20a, which accommodates a client's year-beginning goals, is preferred.

Issues to be addressed during a Goal Tracking meeting may include for example the following:
  Financial position update
  Projected cash flow
  Progress reports
  Life changes and assumptions
  Reaffirm priorities
  Revisit prior recommendations
  Executive compensation analysis
  Questions on which the advisor should be prepared for the Goal Tracking meeting include for example the following:
  How am I progressing toward my goals?
  Do I need to save more or can I save less?
  Do I need to change the time frame for my goals?
  How much do I have and where is it invested?
  What will my cash flow and expenses look like this year?
  Can I spend more money now?
  Can I enhance my gifts to children, grandchildren or to charity?
  Am I taking too much or too little risk in my investments?
  Should I restructure my debt?
  What is the proper amount to have as a reserve for emergencies?
  What are the risks to my financial life?

The objective of client goal assessment 40a is to concentrate primarily on a client's financial standing, the feasibility of goal attainment, and the performance of holdings. For example, a meeting in the first portion of the year, e.g., a first quarter meeting 20a, would assess a client's current and future financial position relative to his or her goals and objectives. Such future objectives may include education planning, weddings, retirement, etc. Further, topics devoted specifically to second, third, and fourth quarters, 40b, 40c, and 40d, respectively, may be discussed broadly in preparation of upcoming meetings, e.g., 20b, 20c and 20d, including an income tax review (examining past years' tax returns and charitable donations, etc. to facilitate formulation of a tax strategy), estate planning, asset management and the scheduling of an ongoing financial plan.

Second Quarter—Asset Allocation

A second quarter meeting may be scheduled for later in the first half of the year. A useful grouping of topics for this meeting may be referred to as "Asset Allocation." Such a meeting (40b) will concentrate on past performance and current standing of client assets. Issues to be addressed during an Asset Allocation meeting may include for example the following:
  Complete portfolio rebalancing/re-reoptimization
  Asset allocation design
  Risk/suitability analysis
  401(k)/403(b) guidance
  Questions on which the advisor should be prepared for the Asset Allocation meeting include for example the following:
  What is the optimal mix of investments for my situation?
  How do I change from where my investments are today to where I need to be?
  How should my retirement plans at work be invested?
  Are there tax implications to making changes in my portfolio?
  Is my record keeping adequate for my investments?
  Are there different types of investments I should be considering?

At the Asset Allocation meeting, present and proposed asset levels will be analyzed and discussed in detail, such that any necessary adjustment may be calculated and an appropriate strategy implemented. The object of the Asset Allocation meeting is to formulate with each client a plurality of asset allocation recommendations, which will serve as the basis for all investment decision making and, in particular, the basis for a third quarter 30c formal advisor-client investment review, wherein second quarter client asset allocation recommendations may be utilized as explained below. In this manner, an advisor's office resources will be devoted substantially exclusively to asset allocation, analysis and execution 40b during the second quarter 30b for a predetermined plurality of an advisor's clients.

Third Quarter—Mid-Year Reviews

A third quarter meeting 20c may be scheduled for early in the second half of the year. Topics for this meeting may be generally grouped under the heading of "Mid-Year Reviews." The Mid-Year Review meeting will focus on investment performance and progress, and on issues of insurance and estate planning. Issues to be addressed during an Mid-Year Review meeting may include for example the following:

Cash flow revisited
Annual insurance review
Estate planning strategies
Employee benefits Questions on which the advisor should be prepared for the Mid-Year Review meeting include for example the following:

Is my cash flow working out as planned or do I need to re-evaluate my expenses?
What would happen if I couldn't work anymore or became disabled?
What is my plan if I needed custodial care someday (who, how, where)?
Do I have the right amount of life insurance?
Is the type of life insurance I have the best for my current situation?
What are the risks to my personal property?
Am I exposed to lawsuits and how can I protect my wealth?
If I die would my assets go to the people I want as easily as possible?
Do I have an effective power of attorney or will in place?
How does my financial situation affect other family members?
How do other family financial situations affect me?
What should I do with my employee benefits at work?

The third-quarter client meeting 20c is preferably devoted to a mid-year reviews of a variety of topics 40c, including cash flow, investments, insurance, and estate planning, etc. Such topics have particular relevance to most, if not all, of a financial advisor's plurality of clients. Further, for a plurality of clients who have been integrated into a seasonal workflow, the third quarter 30c is particularly well-suited for reflection on current year investments and finances following an asset allocation review. Money market and sweep accounts may also be replenished, if necessary, for purposes of paying fees. A cash flow assessment would generally involve an evaluation of cash flow strategies and maintenance.

The third quarter investment review will preferably involves a formal assessment of investment progress. Second quarter 30b individual client asset allocation recommendations are preferably utilized in advance of the third quarter 30c investment review by the advisor or investment partner to formulate a recommended list of securities which are used to evaluate individual stocks, mutual funds, bonds and other securities in client accounts. While investment review has been highlighted as a preferred element of the third quarter advisor-client meeting 20c, because of the importance of investments, the status of any such client investment is a likely topic of each advisor-client meeting 20 and thus, should not be restricted to any one quarter 30a, 30b, 30c or 30d.

An annual insurance review is also an appropriate topic of consideration for the third quarter review 40c, and the adequacy of existing insurance, and reprojections may be of importance. As detailed in FIG. 2, it is also preferred that an annual estate planning review take place at this meeting, which may be facilitated by creating and utilizing an estate tax balance sheet. If appropriate, estate/trust coordination and/or recent changes in tax law may be discussed. The intended purpose of the third quarter, i.e., midyear, review 40c is to assess broad topics applicable to each of an advisor's plurality of clients, while concentrating on those topics which have particular importance to an individual client. Other topics of consideration may be employee stock options, aggregation services, etc.

Fourth Quarter—Tax Planning

A fourth quarter meeting may be scheduled toward the end of the year, but in sufficient time to allow the client to implement any recommended tax decision or elections. This meeting will be devoted substantially exclusively to a tax planning review. Topics for this meeting may be generally grouped under the heading of "Tax Planning." Issues to be addressed during an Tax Planning meeting may include for example the following:

Tax information gathering
Coordination with tax professional
Tax summary letter
Year end strategy
Long term tax planning Questions on which the advisor should be prepared for the Tax Planning meeting include for example the following:

Are there decisions I can make before the end of the year that can help manage tax liability?
How can I effectively communicate everything about my taxes to my accountant?
Should I take gains or losses this year or next?
How will potential tax law changes affect my decisions?
Am I using my retirement plans correctly?
Should I try to accelerate or delay income and expenses?
Am I withholding enough or do I need to make or change an estimated tax payment?
Are my investments tax efficient?
What outstanding information will I need to complete my taxes?

Fourth quarter, advisor-client meeting 20d of the financial planning year is preferably devoted substantially exclusively to a tax planning review 40d. In preparation of such a review, it is desirable to obtain any relevant information from a client beforehand such that the client's accountant may be contacted and present, if necessary. A preliminary year-end tax planning strategy with client and accountant may be developed so as to maximize a client's after-tax net worth.

Data relating to the client's financial affairs is collected at each of the meetings described above and stored in a database. Each meeting as describe herein may be accompanied by a relevant audiovisual presentation, showing the client's financial status and projections, e.g., for retirement, based on calculations performed on the data which has been collected. Goals and policies may be adjusted during the meetings and re-entered in the systems to update and refine the presentations.

Dividing a financial planning year 30 for all firm clients (or for a selected portion of the firm's clients), as described, and scheduling meetings and actions accordingly, may be used to synchronize client meetings 20 and the topics 40 thereof, and the related preparation and follow-up, providing for improved customer relations and management capabilities and allowing financial advisors and other office personnel to manage workflow more efficiently and with improved quality.

In addition to improved efficiency and synchronized workflow, the system 10 can be designed to focus on the needs of higher net-worth/asset individuals, resulting in greater investment balances. Both the advisor and staff develop an expertise in matters to be handled during each quarterly period 30a, 30b, 30c, and 30d, such that answering client questions and implementing particular strategies takes less time. With regard to clients, expectations are set in advanced such that clients approach meetings with increased attention. In addition, there is less need for clients to focus on finances between service meetings, as upcoming advisor-client meetings 20 may be scheduled in advance, during a first portion, or quarter of the financial planning year 30a.

Exemplary Workflow Implementation

Figure 3:
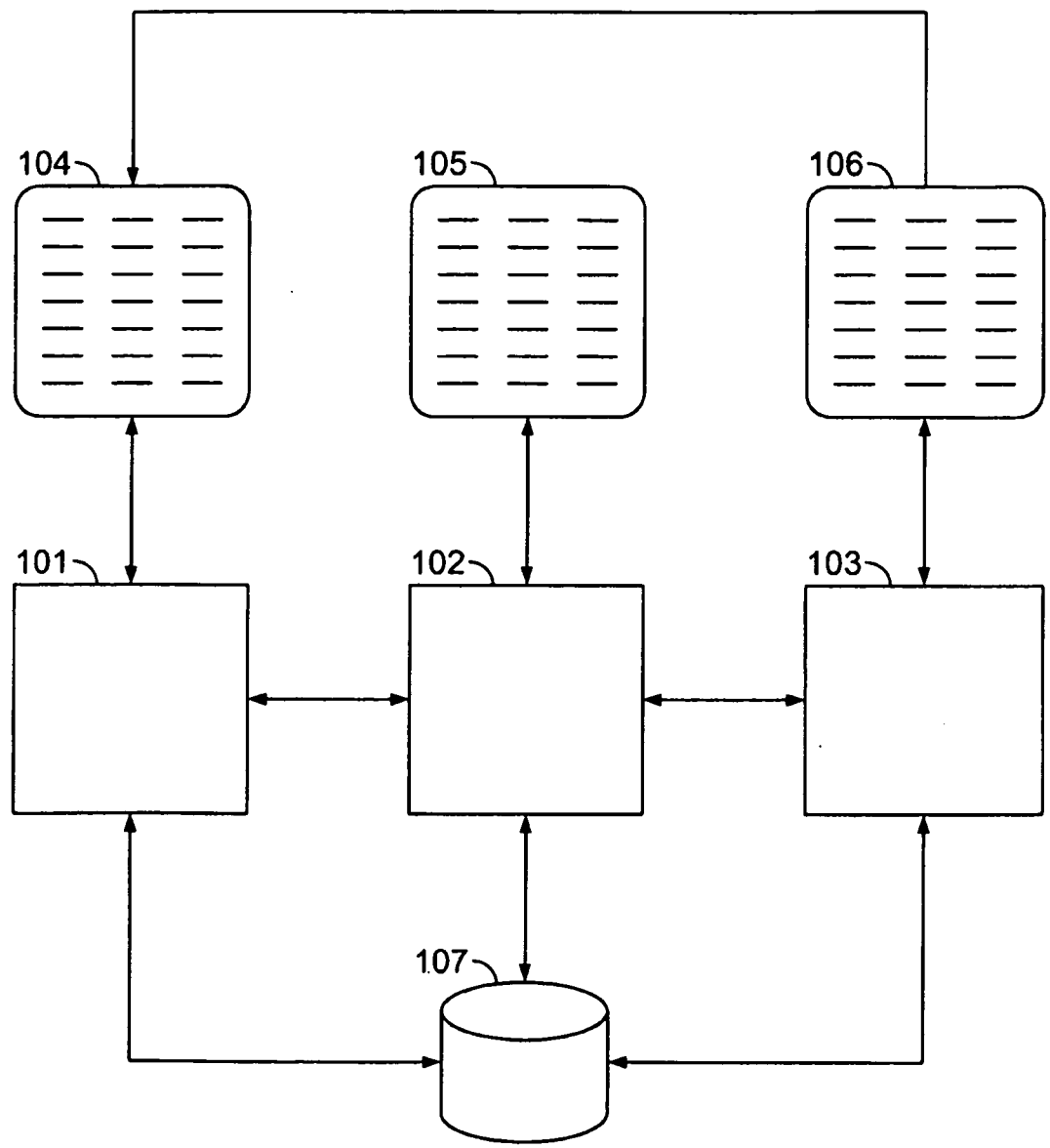
FIG. 3 is a block diagram showing a system for implementing workflow management for a financial advisory firm in accordance with one embodiment.

In a further embodiment, workflow of the financial advisory firm may be controlled by utilizing a plurality of processors to automate workflow handling. In one such embodiment, as shown in FIG. 3, the system comprises a first processor 101, a second processor 102, and a third processor 103.

The term "processor" as used herein can be any type of processor, including a virtual processor, or a routine programmed to perform on a programmable processor. The first and second processors as described herein can for example be physically separate processors, or separate programmed routines executing on the same physical processor.

First processor 101 provides a routine that presents user interface 104, to accept, store, display and edit input of identifying information for a plurality of the firm's financial advisory clients input of client data. It also provides a routine to accept, store, display and edit, from interface 104, appointment data for a plurality of meetings with each client over the course of a financial planning period. As described above, the meetings are scheduled to occur within a plurality of specified time periods allocated from the time available within the financial planning period. Further, the meetings within each of the specified time periods are identified within first processor 101 as associated with one predetermined and substantially distinct topic that has been identified by the firm as most pertinent to the specified time period. First processor 101 stores the data entered through interface 104 in storage device 107.

Second processor 102 provides at least one routine to aggregate by date ranges within each of the specified time periods the number of appointments in each date range set within first processor 101 and stored in storage device 107, and to calculate the percentage of clients scheduled for the specified time period. Second processor 107 also has an associated user interface 105, which displays the aggregations and calculations.

Third processor 103 provides at least one routine to generate at least one report, which may be printed, or displayed through user interface 106, showing workflow efficiency based on data calculated by the second processor, comprising at least the display of the percentage of available meeting resources that has been scheduled. Other resource utilization and efficiency metrics may be calculated and displayed as well. The reported figures may be used, as shown by the arrow from 106 to 104, to modulate input into first processor 101, such as by scheduling further appointments to more fully utilize available meeting times.

For purposes of illustration, the user interface displays of the processors disclosed herein are shown greater detail in FIGS. 4, 5 and 6. In the illustrative embodiment shown in these figures, processors 101, 102 and 103 have been implemented in the form of Microsoft® Excel® spreadsheets, as interconnected spreadsheet objects. In some embodiments, processors 101, 102 and 103 run on a general purpose digital computer. In the example shown, each processor is represented by a separate worksheet, though this need not be the case in practice. FIGS. 4, 5 and 6, respectively are simplified versions of the screen displays generated by these processors, adapted to illustrate the principles disclosed herein. The displays in FIGS. 4, 5 and 6 correspond, respectively, to user interfaces 101, 102 and 103 in FIG. 1.

The full programming for the spreadsheets underlying FIGS. 4, 5 and 6 is set forth in the appendix hereto which has been incorporated by reference. The spreadsheet files are in human-readable textual XML form, as extracted from the .xlsx Excel workbook file for these processors. The formulas that perform the calculations described in this disclosure are designated by the tag "<f>" within the XML code. The reader may refer to the contents of the "<f>" tags in the incorporated XML files in the Appendix to see all of the formulas that were used to create the exemplary processors.

The user interface 104 for the first processor 101 is shown in greater detail in FIG. 4. First processor 101 has routines for entering and storing the names 402 and personal details 403 of a plurality of clients 404. To the right of client names and particulars in FIG. 4 are four sets of columns 405-408, for scheduling appointments for Goal Tracking, Asset Allocation, Mid-Year Reviews and Tax Planning meetings, respectively. As shown, the date and time set for these meetings may be entered, and stored in storage device 106, using appropriate routines provided by the first processor.

The user interface for second processor 102 is shown in greater detail in FIG. 5. Second processor 102 aggregates appointments set in the first processor, by specified weekly periods as shown in the left-most column 501 of the Excel display. The aggregated totals by week are displayed in the second column 502. The formula used, for example, in cell 503, to perform the aggregation is as follows (in which first processor 101 is referenced as "Phase 2 Tracking List"):

```
=SUMPRODUCT(
    ABS($A8<='Phase 2 Tracking List'!$R$4:$R$5000),
    ABS(($A8+7)>'Phase 2 Tracking List'!$R$4:$R$5000),
    ABS('Phase 2 Tracking List'!$R$4:$R$5000>0)
)
+
SUMPRODUCT(
    ABS($A8<='Phase 2 Tracking List'!$T$4:$T$5000),
    ABS(($A8+7)>'Phase 2 Tracking List'!$T$4:$T$5000),
    ABS('Phase 2 Tracking List'!$T$4:$T$5000>0)
)
+
SUMPRODUCT(
    ABS($A8<='Phase 2 Tracking List'!$V$4:$V$5000),
    ABS(($A8+7)>'Phase 2 Tracking List'!$V$4:$V$5000),
    ABS('Phase 2 Tracking List'!$V$4:$V$5000>0)
)
+
SUMPRODUCT(
    ABS($A8<='Phase 2 Tracking List'!$X$4:$X$5000),
    ABS(($A8+7)>'Phase 2 Tracking List'!$X$4:$X$5000),
    ABS('Phase 2 Tracking List'!$X$4:$X$5000>0)
)
```

Second processor 102 is initialized as shown at 504 with the value of the presumed weekly capacity, in this case 12. Sufficient weekly rows 505-508 are allocated to accommodate the total number of seasonal planning clients as shown at 509 within the available weeks, assuming a reasonable utilization. Periods 510-514 before and after the allocated weekly periods are "blacked out" as presumably not needed for client meetings. These periods may be used for other purposes, such as marketing, training, vacations, Phase 1 activities, and the like.

Also shown in FIG. 5 are completion percentages 516-519, calculated by second processor 102 by dividing the sum of the meetings set for the applicable quarterly period in the second column 504 by the number of clients, 509. These percentages are also stored in storage device 106.

The completion percentages 516-519 are linked back to the first processor, and shown at 409-412 in FIG. 4. It is also linked to a Monthly Flash Report as shown in FIG. 6.

The Monthly Flash Report shown in FIG. 6 is itself generated by third processor 103, based on data from second processor 102, and corresponds to user interface 106 in FIG. 3. Third processor 103 generates a variety of utilization statistics based on the results calculated by second processor 102, including an available hour percentage 601, showing how many of the available client meeting hours remain available and need to be scheduled; seasonal planning appointment status figures 602-605, as well as statuses for other non-seasonal areas of the firm's practice (606-607 and 608-609).

The outputs provided by third processor 103, as reflected in FIG. 6, may be used to calibrate client scheduling activity, resulting in input into first processor 101, which will be processed by processor 102 and modify the figures displayed by third processor 103 in user interface 106.

The approach described herein proactively stimulates staff to schedule regular client meetings. For example, if, as shown a large percentage of meeting slots remain to be scheduled, the Monthly Report display will highlight this fact and can be used as a monitor to cause the staff to step up scheduling calls. As the schedules start filling up, this fact—including a precise metric of utilization—will be apparent as well.

While the preferred embodiment of the invention has been described in detail, variations in fashioning and implementing the systems and methods described herein will be apparent to those of skill in the art, without departing from the scope and spirit of the invention, as defined in the following claims.

We claim:

1. A system for managing work in a financial advisory firm, comprising:
    a display;
    a storage device;
    at least one physical programmable processor; and
    a first, second and third processor, each of the first, second and third processors executing on one of the at least one physical programmable processors, wherein:
    the first processor comprises
        a routine to accept, store in the storage device, display on the display and edit input of identifying information for a plurality of the firm's financial advisory clients, and
        a routine to accept, store in the storage device, display on the display and edit input of appointment data for a plurality of meetings with each client over the course of a financial planning period, the meetings being scheduled to occur within a plurality of specified time periods allocated from the time available within the financial planning period, the meetings within each of the specified time periods being identified within the first processor as associated with one predetermined topic of a plurality of topics that is the most pertinent of the plurality of topics to the specified time period;
    the second processor comprises at least one routine to aggregate by date ranges within each of the specified time periods the number of appointments in each date range set within the first processor, and calculating the percentage of clients scheduled for the specified time period, and
    the third processor comprises at least one routine to generate at least one report showing workflow efficiency based on data calculated by the second processor, comprising at least the display of the percentage of available meeting resources that has been scheduled.

2. The system of claim 1, further comprising a general purpose digital computer, spreadsheet software running on the computer, and wherein the first, second, and third processors are mutually linked spreadsheets running under the spreadsheet software.

3. The system of claim 1, wherein the financial planning period is a calendar year.

4. The system of claim 2, wherein the plurality of specified time periods allocated for meetings are calendar quarterly periods.

5. The system of claim 2, wherein the plurality of specified time periods allocated for meetings are seasonal periods.

6. The system of claim 1, wherein the plurality of topics comprises goal tracking, asset allocation, mid-year review, and tax planning.

7. The system of claim 1, wherein the processors are implemented in a computer system as interconnected spreadsheet objects.

8. The system of claim 7, wherein the first processor is interconnected with completion percentages calculated by the second processor.

9. The system of claim 7, wherein the third processor is interconnected with completion percentages calculated by the second processor.

10. The system of claim 7, wherein the third processor generates a monthly report based on data from the second processor, and generates a display showing data comprising available hour percentage and appointment status.

* * * * *